United States Patent
Kobori et al.

(10) Patent No.: US 6,816,395 B2
(45) Date of Patent: Nov. 9, 2004

(54) SWITCHING POWER SOURCE DEVICE

(75) Inventors: Katsumi Kobori, Miyagi (JP); Masami Okada, Miyagi (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 10/221,961
(22) PCT Filed: Jan. 18, 2002
(86) PCT No.: PCT/JP02/00353
§ 371 (c)(1),
(2), (4) Date: Feb. 19, 2003
(87) PCT Pub. No.: WO02/058222
PCT Pub. Date: Jul. 25, 2002

(65) Prior Publication Data
US 2003/0151928 A1 Aug. 14, 2003

(30) Foreign Application Priority Data
Jan. 19, 2001 (JP) ......................... 2001-012098

(51) Int. Cl.$^7$ ............................................. H02M 3/24
(52) U.S. Cl. ..................................... 363/97; 363/21.02
(58) Field of Search ................................ 363/20, 21.01, 363/78, 84, 95, 97

(56) References Cited

U.S. PATENT DOCUMENTS

| | | | |
|---|---|---|---|
| 5,285,368 A | | 2/1994 | Ishikawa |
| 5,699,236 A | * | 12/1997 | Choi ............................ 363/15 |
| 5,705,920 A | * | 1/1998 | Watanabe et al. ........... 323/285 |
| 5,834,857 A | | 11/1998 | Abe et al. |
| 5,909,363 A | * | 6/1999 | Yoon ......................... 363/21.16 |
| 5,953,218 A | * | 9/1999 | Mukaibara ................ 363/21.09 |
| 6,314,004 B1 | * | 11/2001 | Higuchi ..................... 363/21.07 |
| 6,341,075 B2 | * | 1/2002 | Yasumura ................. 363/21.02 |

FOREIGN PATENT DOCUMENTS

| | | |
|---|---|---|
| JP | 4-101289 | 9/1992 |
| JP | 5-68374 | 3/1993 |
| JP | 7-298612 | 11/1995 |
| JP | 2000-4583 | 1/2000 |

* cited by examiner

Primary Examiner—Adolf Berhane
(74) Attorney, Agent, or Firm—Rader, Fishman & Grauer PLLC; Ronald P. Kananen

(57) ABSTRACT

The present invention provides a switching power supply which includes a main rectifying and smoothing circuit (40) and a secondary rectifying and smoothing circuit (50) for rectifying and smoothing an output obtained at a secondary coil (22) of a converter transformer (20) whose primary coil (21) is supplied with a switching output from a switching element (30) which switches a direct input. A error detecting circuit (60), which is driven by a secondary rectified and smoothed output from the secondary rectifying and smoothing circuit (50), detects a main rectified and smoothed output from the main rectifying and smoothing circuit (40) to be supplied to loads so as to control the switching operation of the switching element (30) by the PWM controlling circuit (80) so that the main rectified and smoothed output is caused to be a predetermined state, and compares the voltage of the secondary rectified and smoothed output with the voltage of the main rectified and smoothed output so as to change the operation state of the PWM controlling circuit (80) to the standby mode in case the voltage of the secondary rectified and smoothed output declines to come below the voltage of the main rectified and smoothed output by a predetermined value.

1 Claim, 4 Drawing Sheets

SERIOUS OSCILLATION

INTERMITTENT OSCILLATION

SWITCHING POWER SOURCE DEVICE

TECHNICAL FIELD

The present invention relates to a switching power supply which is provided with a standby mode.

BACKGROUND ART

Conventionally, there are widely used switching power supplies for switching a direct current, which is obtained by rectifying and smoothing a commercial alternating current, with a high frequency of approximately 100 kHz to convert the direct current to a voltage of a desired value using a transformer with a high efficiency ratio.

As methods for controlling an output voltage of these switching power supplies, there are employed the PWM (Pulse Width Modulation) method which controls the duty ratio of a switching pulse corresponding to the variation of an output voltage, the frequency controlling method and the phase controlling method which controls frequency and phase of a switching pulse, respectively, such as resonating, etc.

Conventionally, in a switching power supply used in such as an AC adapter, a converter continues to perform switching operation in series. Thus, power for driving a switching element of the converter and power consumed at a controlling circuit is large, and the ratio of the power against output power is large. So, not only the conversion efficiency is lowered, but also restraining power consumption at the standby state is difficult.

To cope with this inconvenience, there is practically used a switching power supply provided with the standby mode which can reduce power for driving a switching element of the converter and power consumed at a controlling circuit and lessen power consumption at the standby state by observing the outputting state to detect the standby state and changing the operation mode of a switching element of a converter from ordinary serious oscillation state to intermittent oscillation state, as shown in FIG. 1.

In observing the outputting state, for example, as shown in FIG. 2, a detection resistor Rs is connected in series to an output line, and the value of a voltage ΔVs between ends of the detection resistor Rs is detected for judgement.

However, in a conventional switching power supply, when coming into the standby state, an output voltage is caused to be 0 or an extremely small value. Thus, in order to keep the value of the voltage ΔVs between ends of the detection resistor Rs higher than a value of a certain extent at the standby state, the value of the detection resistor Rs is required to be enlarged. In this case, since loss of power caused by the detection resistor Rs becomes large in the ordinary operation state, a conventional switching power supply has a switching element Q1 connected in parallel to the detection resistor Rs to shunt the output line in the ordinary operation state to reduce loss of power. On the other hand, there is raised a problem that increase of the number of parts and components and new loss of power caused by such countermeasure prevent a switching power supply from being reduced in size and price.

DISCLOSURE OF THE INVENTION

Accordingly, the present invention has an object to overcome the above-mentioned drawbacks of the prior art by providing a switching power supply which does not have a detection resistor causing loss of power, whose operation mode can be changed to the standby mode, enabling the reduction in size and price of the apparatus itself.

The above object can be attained by providing a switching power supply, including:

switching means for switching a direct input;

switching control means for controlling the switching operation of the switching means;

a converter transformer whose primary winding is supplied with a switching output from the switching means;

main rectifying and smoothing means and secondary rectifying and smoothing means for rectifying and smoothing an output obtained at a secondary winding of the converter transformer; and error detection means, which is driven by a secondary rectified and smoothed output from the secondary rectifying and smoothing means, for detecting a main rectified and smoothed output from the main rectifying and smoothing means to be supplied to loads so as to control the switching operation of the switching means by the switching control means so that the main rectified and smoothed output is caused to be a predetermined state, and for comparing the voltage of the secondary rectified and smoothed output with the voltage of the main rectified and smoothed output so as to change the operation state of the switching control means to the standby mode in case the voltage of the secondary rectified and smoothed output declines to come below the voltage of the main rectified and smoothed output by a predetermined value.

BEST MODE FOR CARRYING OUT THE INVENTION

The present invention will further be described below concerning the best modes with reference to the accompanying drawings.

Figure 1:
FIG. 1 shows a diagram for explaining operations of ordinary operation mode and standby mode of a conventional switching power supply.
Figure 1:
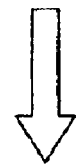
Figure 1:
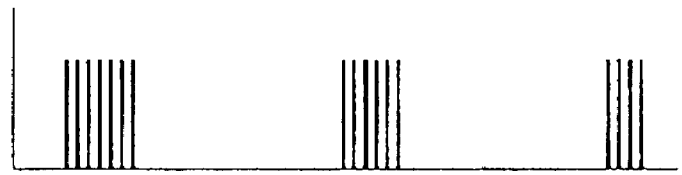
Figure 2:
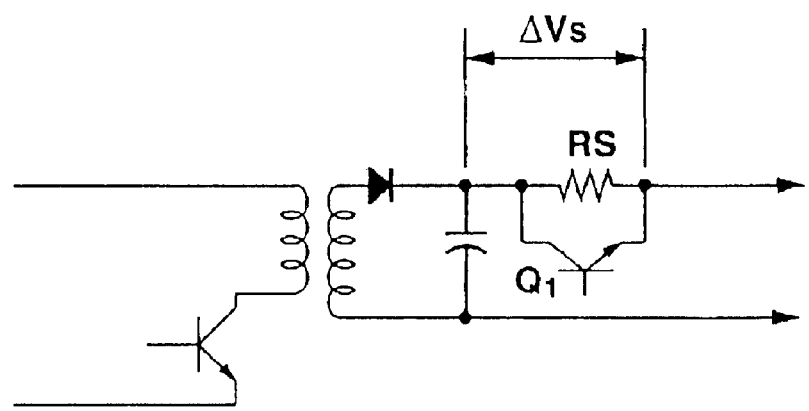
FIG. 2 shows a circuit diagram of the main configuration of the conventional switching power supply for detecting the standby state by observing the outputting state.
Figure 3:
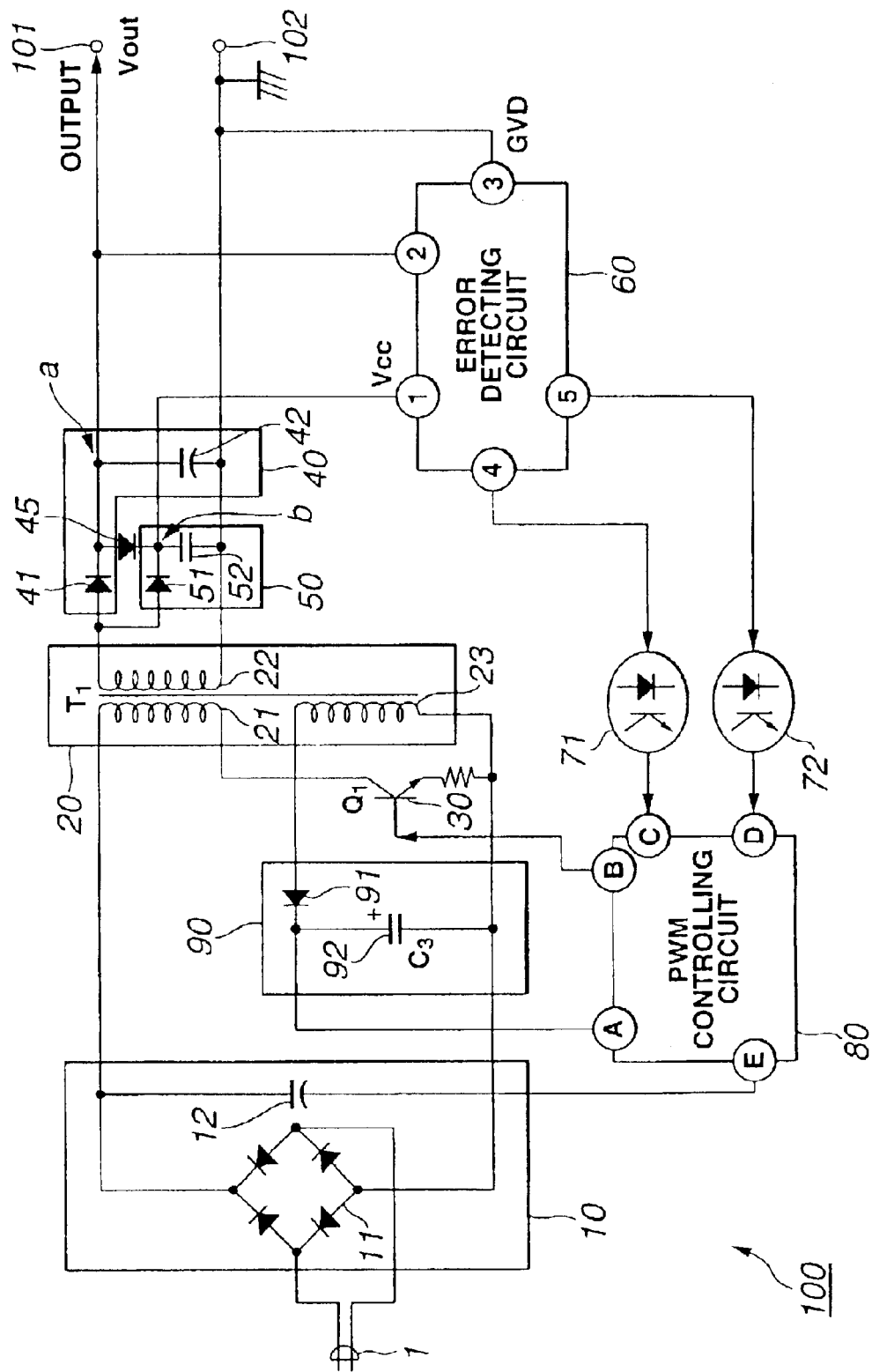
FIG. 3 shows a circuit diagram of the configuration of a switching power supply of the present invention.

FIG. 3 shows the configuration of a switching power supply 100 according to the present invention. The switching power supply 100 shown in FIG. 3 includes an AC rectifying unit 10 consisting of a rectifying circuit 11 connected to a commercial power input terminal 1 and a smoothing capacitor 12. The switching power supply 100 further includes a converter transformer 20 and a switching element 30, and the converter transformer 20 has its primary coil 21 connected to the AC rectifying unit 10 via the switching element 30. Also, the converter transformer 20 has its secondary coil 22 connected to a main rectifying and smoothing circuit 40 consisting of a rectifying diode 41 and a smoothing capacitor 42 and to a secondary rectifying and smoothing circuit 50 consisting of a rectifying diode 51 and a smoothing capacitor 52. The connection point "a" of the rectifying diode 41 and the smoothing capacitor 42 configuring the main rectifying and smoothing circuit 40 and the connection point "b" of the rectifying diode 51 and the smoothing capacitor 52 configuring the secondary rectifying and smoothing circuit 50 are connected to each other via a diode 45.

The switching power supply 100 employs the PWM (Pulse Width Modulation) method, which further includes a PWM controlling circuit 80 for controlling the switching operation of the switching element 30 in the PWM manner.

The main rectifying and smoothing circuit 40 is connected to output terminals 101 and 102. The main rectifying and smoothing circuit 40 is connected to an error detecting circuit 60 which is driven by a rectified and smoothed output from the secondary rectifying and smoothing circuit 50. The error detecting circuit 60 detects a rectified and smoothed output Vout sent from the main rectifying and smoothing circuit 40, and returns an error signal of the rectified and smoothed output Vout to the PWM controlling circuit 80 via a photo transistor 71 based on the detection result. Also, the error detecting circuit 60 judges whether or not loads connected to the output terminals 101 and 102 come into the standby state by observing the rectified and smoothed output Vout, and returns a controlling signal corresponding to the judgement result to the PWM controlling circuit 80 via a photo transistor 72.

The PWM controlling circuit 80 is supplied with an initiating output from an initiating circuit, not shown, and a third output obtained at a third coil 23 of the converter transformer 20 is supplied to a power terminal via a rectifying and smoothing circuit 90 consisting of a rectifying diode 91 and a smoothing capacitor 92.

In thus configured switching power supply 100, when a direct power is obtained at the AC rectifying unit 10 by rectifying and smoothing an alternating power (an AC input) supplied from the commercial power input terminal 1, an initiating signal is sent from an initiating circuit, which is not shown and is driven by the direct power, to the PWM controlling circuit 80, and then the PWM controlling circuit 80 initiates oscillating operation with a frequency of approximately 100 kHz. An oscillating output signal from the PWM controlling circuit 80 causes the switching element 30 to perform switching operation. Then, a second output and a third output are induced at the secondary coil 22 and the third coil 23 of the converter transformer 20 by switching a direct current flowing from the AC rectifying unit 10 to the primary coil 21 of the converter transformer 20.

Thus, the third output obtained at the third coil 23 of the converter transformer 20 is used as a power for driving the PWM controlling circuit 80.

Also, the second output obtained at the secondary coil 22 of the converter transformer 20 is rectified and smoothed by the main rectifying and smoothing circuit 40 to be supplied to loads via the output terminals 101 and 102, and is rectified and smoothed by the secondary rectifying and smoothing circuit 50 to be used as a power for driving the error detecting circuit 60.

The error detecting circuit 60 detects a rectified and smoothed output Vout sent from the main rectifying and smoothing circuit 40, and returns an error signal of the rectified and smoothed output Vout to the PWM controlling circuit 80. Then, the PWM controlling circuit 80 controls the switching operation of the switching element 30 in the PWM manner so that the rectified and smoothed output Vout is caused to be a constant value.

Figure 4:
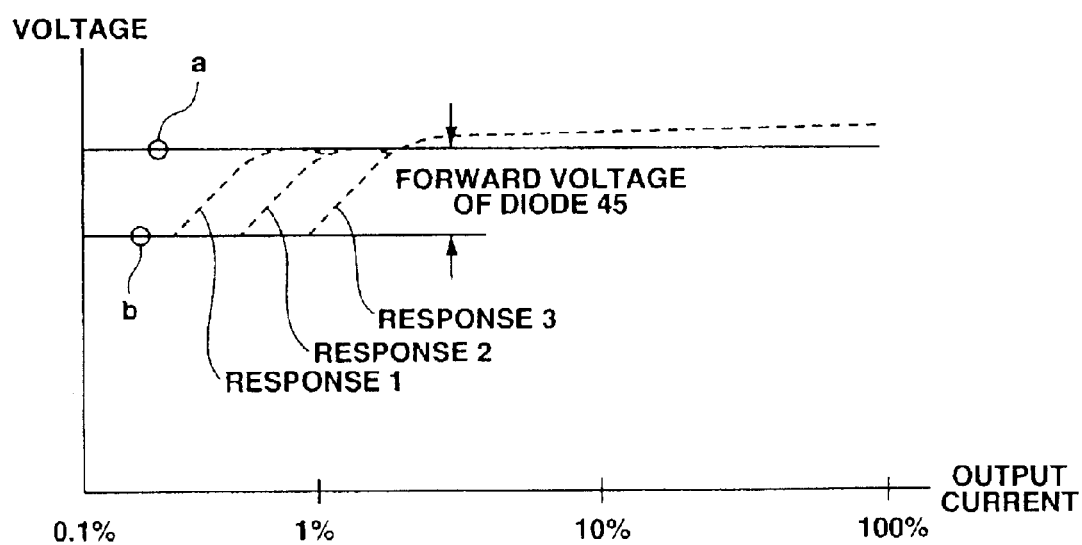
FIG. 4 shows a diagram for explaining the relationship between an output current of a main rectifying and smoothing circuit and output voltages of the main rectifying and smoothing circuit and a secondary rectifying and smoothing circuit of the switching power supply.
Figure 5:
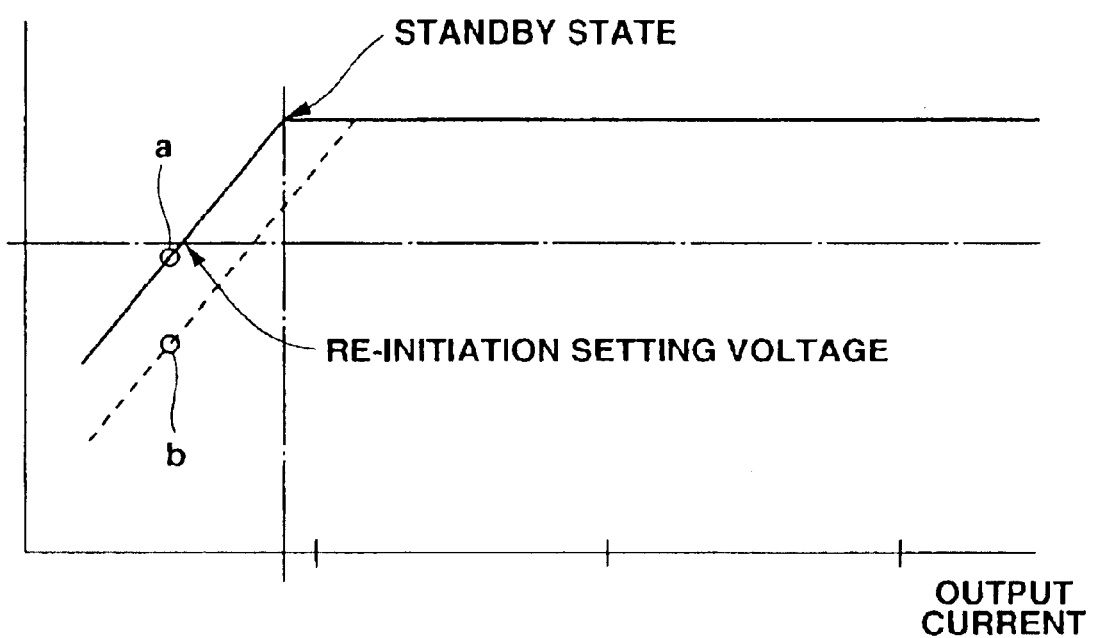
FIG. 5 shows a diagram for explaining the changing control of the switching power supply to the standby mode.

When an output current from the main rectifying and smoothing circuit 40 is reduced under this state, output voltages of the main rectifying and smoothing circuit 40 and the secondary rectifying and smoothing circuit 50 change, as shown in FIG. 4. That is, an output voltage of the secondary rectifying and smoothing circuit 50 declines when the output current comes to a certain current value, as shown by dotted lines in FIG. 4. The current value is substantially proportional to a current consumed at the error detecting circuit 60. That is, the output voltage is shown by response 3 in case the current consumed at the error detecting circuit 60 is large, while being response 1 in case the current is small.

Thus, the voltage of the connection point "b" of the rectifying diode 51 and the smoothing capacitor 52 configuring the secondary rectifying and smoothing circuit 50 can be adjusted by changing a current flowing through the error detecting circuit 60. Also, the voltage of the connection point "b" of the rectifying diode 51 and the smoothing capacitor 52 configuring the secondary rectifying and smoothing circuit 50 is lower than that of the connection point "a" of the rectifying diode 41 and the smoothing capacitor 42 configuring the main rectifying and smoothing circuit 40 by a forward voltage of the diode 45 which is located between the connection point "a" and the connection point "b".

In the switching power supply 100, the error detecting circuit 60 judges whether or not loads connected to the output terminals 101 and 102 come into the standby state by comparing the voltage at the connection point "a" with that of the connection point "b". Then, the error detecting circuit 60 sends a controlling signal for changing the operation mode to the PWM controlling circuit 80 via the photo transistor 72. That is, the error detecting circuit 60 sends a controlling signal for giving the PWM controlling circuit 80 on-timing of intermittent operation to change the operation mode to the standby mode in case the standby state is detected, while giving off-timing of intermittent operation thereto in case the voltage of the connection point "a" or the connection point "b" declines to come below a re-initiation setting voltage.

Under the state of the intermittent operation, the voltage at the connection point "b" drastically declines since power is not supplied thereto during a period of time. On the other hand, the operation of the error detecting circuit 60 can be secured since the voltage of the connection point "a" is continuously supplied to the connection point "b" via the diode 45.

As in the above, the present invention can provide a switching power supply which does not have a detection resistor causing loss of power, whose operation mode can be changed to the standby mode by detecting the standby state, enabling the reduction in size and price of the apparatus itself.

What is claimed is:

1. A switching power supply, comprising:
   switching means for switching a direct input;
   switching control means for controlling the switching operation of the switching means;
   a converter transformer whose primary winding is supplied with a switching output from the switching means;
   main rectifying and smoothing means and secondary rectifying and smoothing means for rectifying and smoothing an output obtained at a secondary winding of the converter transformer; and error detection means, which is driven by a secondary rectified and smoothed output from the secondary rectifying and smoothing means, for detecting a main rectified and smoothed output from the main rectifying and smoothing means to be supplied to loads so as to control the switching operation of the switching means by the switching control means so that the main rectified and smoothed output is caused to be a predetermined state, and for comparing the voltage of the secondary rectified and smoothed output with the voltage of the main rectified and smoothed output so as to change the operation state of the switching control means to the standby mode in case the voltage of the secondary rectified and smoothed output declines to come below the voltage of the main rectified and smoothed output by a predetermined value.

* * * * *